United States Patent
Long et al.

[15] 3,688,891

[45] Sept. 5, 1972

[54] CONVEYOR

[72] Inventors: Arthur H. Long, Pittsburgh, Pa.; Edward M. Lyden, Youngstown, Ohio

[73] Assignee: Wm. K. Stamets Company, Columbiana, Ohio

[22] Filed: March 19, 1970

[21] Appl. No.: 20,922

[52] U.S. Cl. ................................................ 198/41
[51] Int. Cl. ............................................. B65g 17/46
[58] Field of Search ....... 198/41, 159; 165/120; 34/8; 214/1 P; 271/63 A

[56] References Cited

UNITED STATES PATENTS

| | | |
|---|---|---|
| 433,800 | 8/1890 | Mayo .................... 198/159 X |
| 557,121 | 3/1896 | Graves .................... 198/41 X |
| 1,168,281 | 1/1916 | Buch .................... 198/41 X |
| 1,773,646 | 8/1930 | Skov .................... 198/41 |
| 3,565,234 | 2/1971 | Birdsong .................... 198/41 X |
| 3,338,374 | 8/1967 | Dudley .................... 198/41 |

FOREIGN PATENTS OR APPLICATIONS 988,255   4/1965   Great Britain .............. 198/41

OTHER PUBLICATIONS

Guide to Magnetic Conveying, Bunting Magnetics Co., Franklin Park, Ill. Dec. 30, 1966, page 7 only.

*Primary Examiner*—Edward A. Sroka
*Attorney*—Oberlin, Maky, Donnelly & Renner

Filed under Rule 47a

[57] ABSTRACT

A conveyor having an upper level where articles are engaged and carried from the bottom thereof, a lower level where articles are engaged and moved from the top thereof and a transition section for moving articles between the two levels. The conveyor has a magnetic rail extending along the lower level and transition section for holding the articles on the conveyor. Selective ejection of articles from the lower level at certain unloading positions therealong is provided by removing the articles from the effective magnetic field of the magnetic rail. Suitable controls are provided for unloading articles at a plurality of unloading positions.

3 Claims, 6 Drawing Figures

INVENTORS
EDWARD M. LYDEN
ARTHUR H. LONG

Oberlin, Maky, Donnelly & Renner
ATTORNEYS

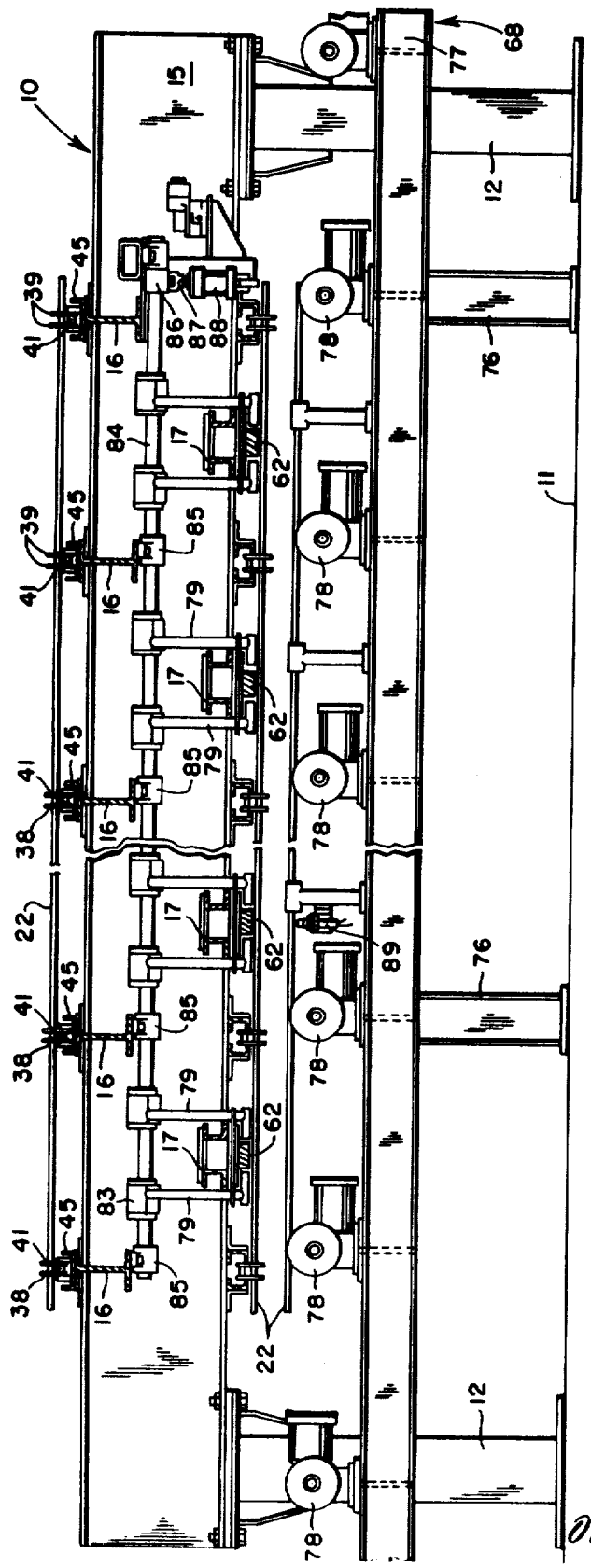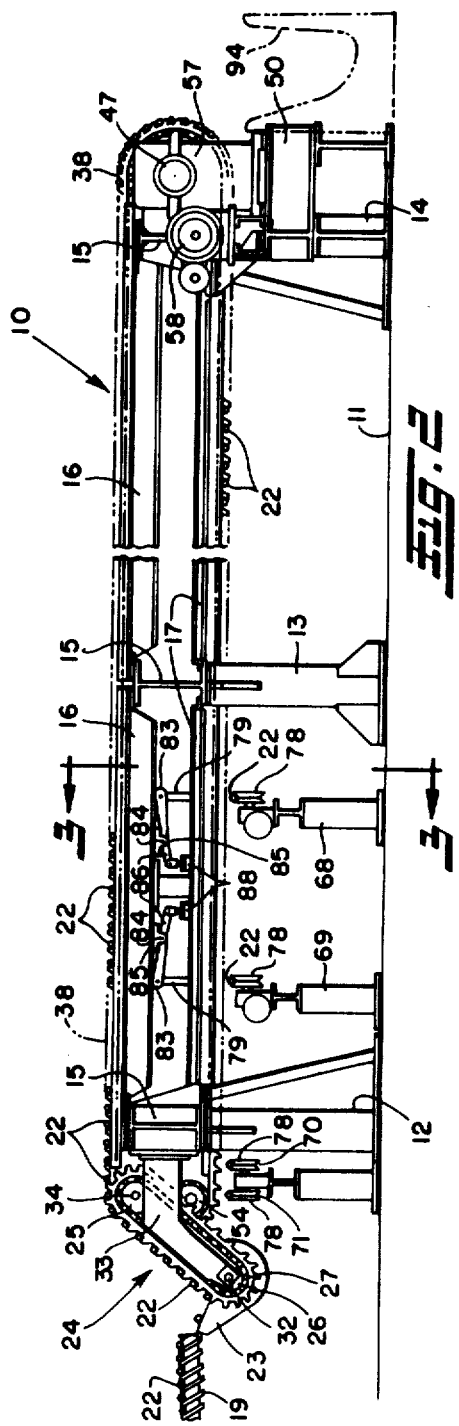

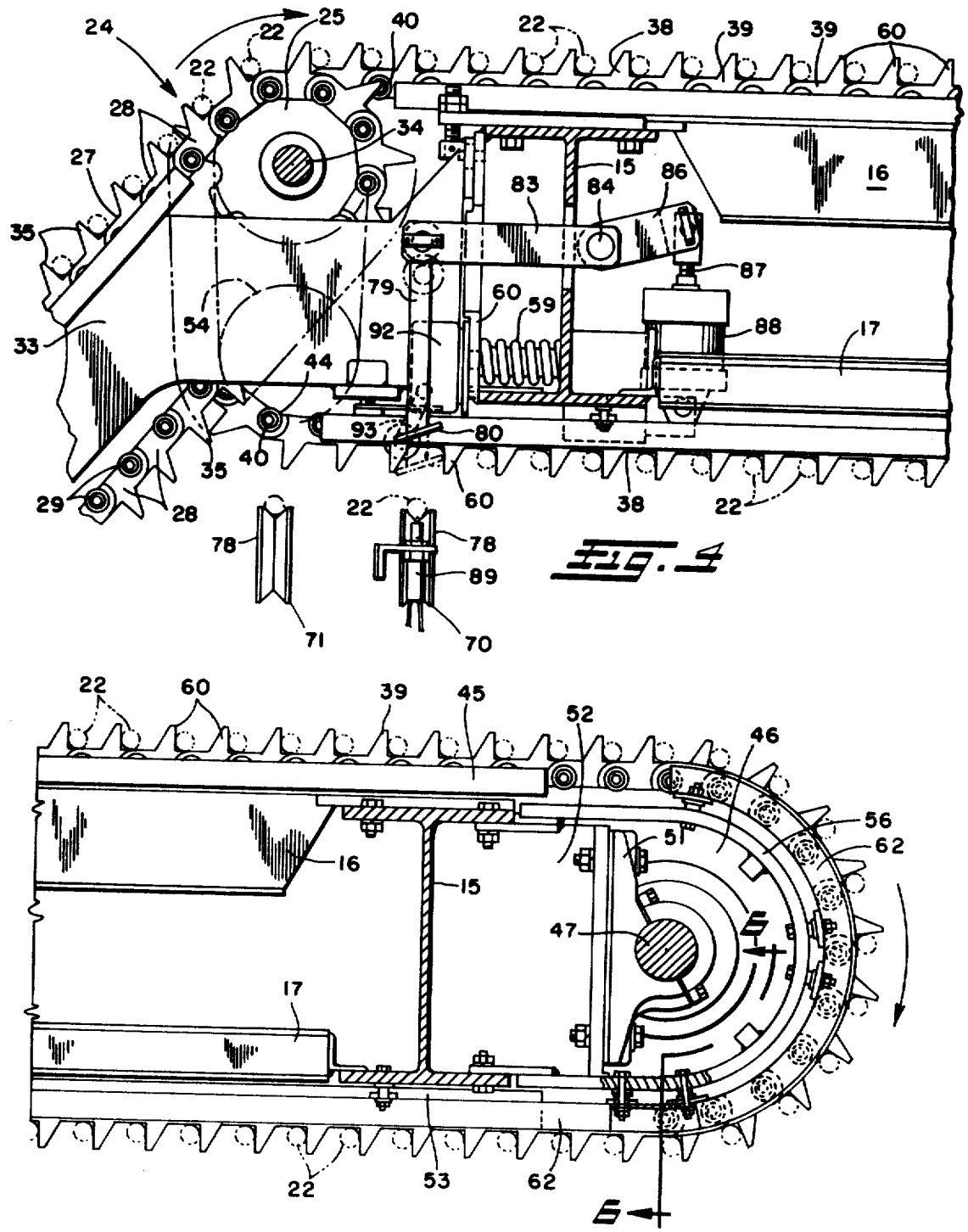

INVENTORS
EDWARD M. LYDEN
ARTHUR H. LONG 3,688,891

CONVEYOR

In the manufacture of elongated steel articles such as pipe, continuous high speed processes have been developed for shaping, welding and cutting the pipe. It has then been necessary to cool the pipe before it is straightened and processed further. The high temperatures and the speed at which the pipe has been received for cooling requires rapid automatic handling and a large cooling table over which the pipe is conveyed during cooling. Pipe having a length of approximately 20 feet and moving along a cooling table at a speed of 15 feet per minute may need a 25-foot cooling table exceeding 90 feet in length. Furthermore, at the end of the cooling table additional pipe handling equipment may be needed which consumes more floor space.

In the present invention the cooling of pipe is provided with a conveyor having two levels which requires a minimum of floor space to cool the pipe and convey it to other processing machinery.

It is another object of this invention to provide magnetic means for retaining the pipe on a cooling table conveyor as it passes from an upper level to a lower level and is carried along the underside of the cooling table.

A further object is to provide apparatus for unloading pipe from the lower level at selected positions.

A still further object is to provide controls for automatically ejecting pipe from the lower level at the proper time to selected conveyors located below the lower level.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the drawings:

FIG. 2 is a schematic side elevation of the cooling transfer table shown in FIG. 1.

FIG. 3 is an enlarged sectional view taken substantially on the line 3—3 of FIG. 2 illustrating the unloading mechanism.

FIG. 4 is an enlarged fragmentary section taken substantially on the line 4—4 of FIG. 1 illustrating the chain tension-applying mechanism and the unloading mechanism at the tail shaft of the conveyor with the unloading arm in the unloading position shown in phantom lines.

FIG. 5 is an enlarged fragmentary section taken substantially on the line 5—5 of FIG. 1 illustrating the sprocket, magnetic rail and chain guide at the head shaft end of the conveyor.

Figure 1:
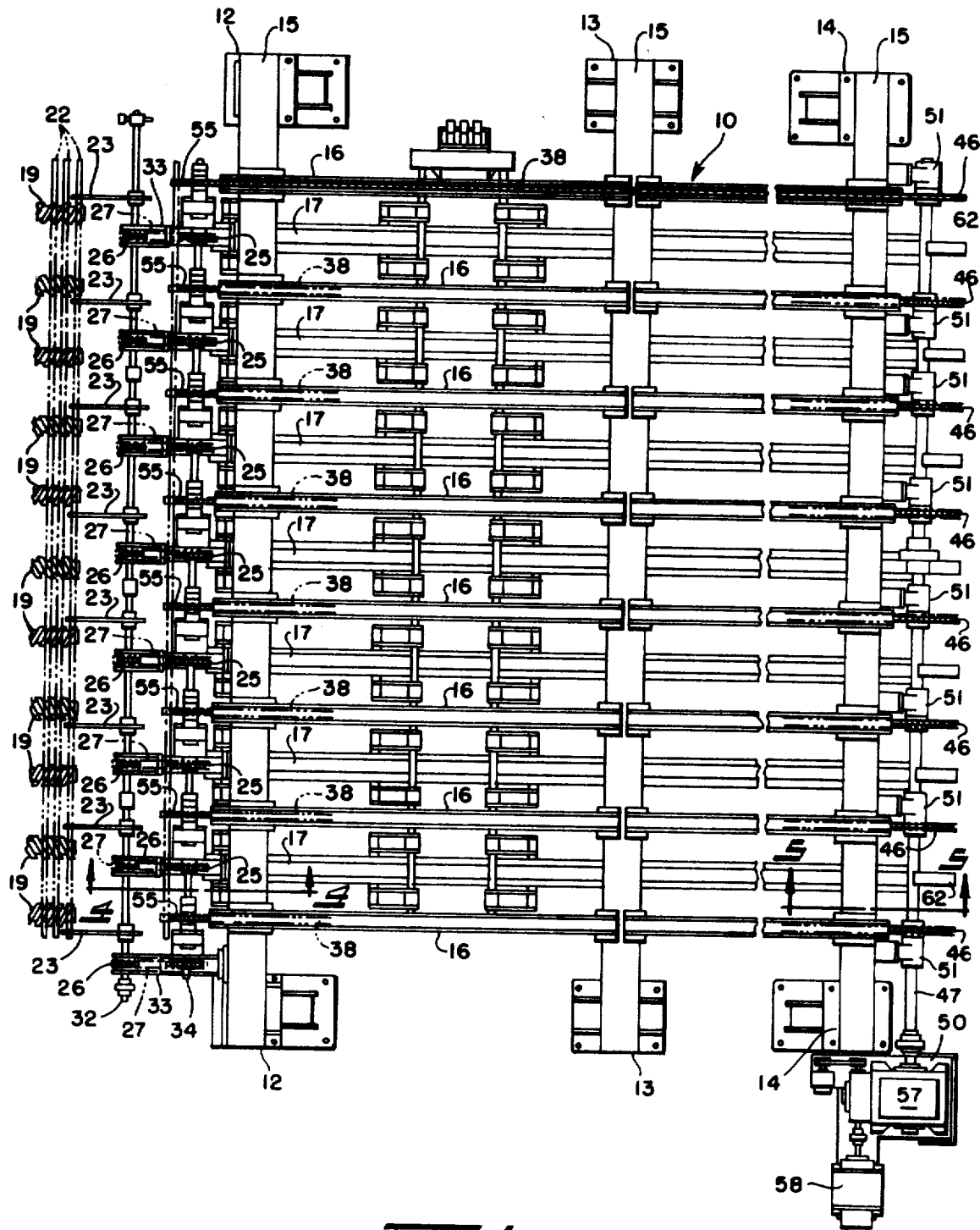
FIG. 1 is a plan view of a cooling transfer table embodying the conveyor of the invention.

Referring now in detail to the drawings, a supporting table structure 10 for elevating the conveyor of this invention above the floor level is shown in FIGS. 1, 2 and 3. The table 10 has vertical leg members 12, 13 and 14 which have lower ends at the floor level 11 and upper ends supporting lateral beams 15 extending from one side of the table to the other. Longitudinal beams 16 extend between the lateral beams 15 at laterally spaced-apart positions and form the top of the table structure 10. Secondary longitudinal beams 17 also connect the lateral beams 15 and are mounted on the lateral beams below the longitudinal beams 16 to form the bottom of the table structure 10. Preferably one of said secondary longitudinal beams is disposed between each pair of longitudinal beams 16. As shown in FIGS. 1 and 3, rotating screw conveyors 19 carry pipe 22 from the area where the pipe is shaped, welded and cut to the cooling area. The screw conveyors 19 may be disposed at an angle to lift the pipe as it is conveyed therealong. At the ends of the screw conveyors 19 the pieces of pipe 22 are dropped on an inclined series of guide rails 23 which are inclined so that the pipe rolls from the screw conveyors to a transfer chain conveyor 24.

As shown more clearly in FIG. 4, a transfer chain conveyor 24 has upper sprockets 25 and lower sprockets 26 which carry chains 27 having links 28 connected by pins 29 with bearing surfaces engageable by the sprockets 25 and 26. The lower sprockets 26 are mounted on a shaft 32 which is supported on brackets 33 connected to one of the lateral beams 15. The upper sprockets 25 are mounted on a tail shaft 34 which is also supported in bearings carried by brackets 33. Each of the links 28 has a projection or finger 35 extending outwardly from the chain 27 to engage and carry the pipe 22. As shown in FIGS. 2 and 4, the sprockets 25 and 26 of the transfer chain conveyor 24 rotate in a clockwise direction for lifting the pipe 22 from the guide rails 23 and feeding the pipe to an article moving means such as parallel endless chains 38 of the cooling table conveyor which carry the pipe on the upper level of the conveyor over the top of the table structure 10. The chains 38 have links 39 connected by pins 40 which carry a spacer sleeve 41 between the links and roller 43 and 44 at the outer edges of the chains.

As shown in FIG. 3, channels 45 are mounted on the longitudinal beams 16 at the top of the table and provide an enclosed track in which the chains 38 may move across the top of the table structure 10. The spacing of the longitudinal beams 16, channels 45 and chains 38 is close enough to provide the support necessary to carry the pipe 22 without distortion and at the same time provide maximum exposure of the pipe to air or other cooling medium as it moves along the table structure 10.

At the other end of the table structure 10 the chains 38 pass over sprockets 46 which are mounted on a head shaft 47 carried by a drive supporting structure 50 and by pillow blocks 51 which are mounted on plates 52 secured to the adjacent lateral beam 15.

After the chains 38 move from the upper level around the sprockets 46 mounted on the head shaft 47 through a transition section from the upper level to a lower level each of the chains 38 is supported by side channels 53 in which the rollers 43 and 44 of the chains 38 are retained. These side channels 53 are straight along the lower level below the bottom of the table structure. Semicircular members 56 mounted on lateral beam 15 support the magnetic rails 62 in the transition section and the secondary longitudinal beams 17 support the magnetic rails along the lower level.

The chains 38 pass around lower sprockets 54 at the tail shaft end of the conveyor and then over upper sprockets 55 which are mounted for rotation on the tail shaft 34.

Referring again to FIGS. 1 and 2, the chains 38 are driven by head shaft 47 which is connected to a speed reducer 57 connected to and driven by a motor 58. The chains 38 engage the upper sprocket 55 on the tail shaft 34 and turn this shaft which rotates upper sprocket 25 of the transfer chain conveyor 24. Speed controls are provided so that the line speed of the transfer chain conveyor 24 is always equal to or exceeds the feeding speed of the screw conveyors 19. This insures that only one pipe is loaded into the same pocket of each chain. Since the sprockets 25 and 55 of the transfer chain conveyor 24 and cooling table conveyor respectively are both mounted on the tail shaft 34, the feed of the pipe 22 from the chains 27 of the transfer chain conveyor to the chains 38 of the cooling table conveyor are synchronized and only one pipe will be carried in each pocket of the chains.

The chains 38 are maintained in tension by compression springs 59 interposed between one of the lateral beams 15 adjacent the tail shaft end of the conveyor and the lower sprockets 54.

As shown in FIGS. 2, 3, 4 and 5, the pipe 22 is carried in the pockets between spaced-apart projections such as fingers 60 extending upwardly from the links 39 on the top of the table structure 10. In this area of the conveyor the gravitational forces hold the pipe 22 against the chain links 39. In the transition section of the conveyor at the head shaft end, article supporting means such as magnetic members which in this embodiment are in the form of magnetic rails 62, are mounted on supporting members such as angles 64 secured to the lateral beams 15 of the table structure. The magnetic rail 62 may be of an electromagnetic type or as in this case may be of permanent magnets which are isolated from the other metal parts of the table structure to retain their magnetic force.

Figure 6:
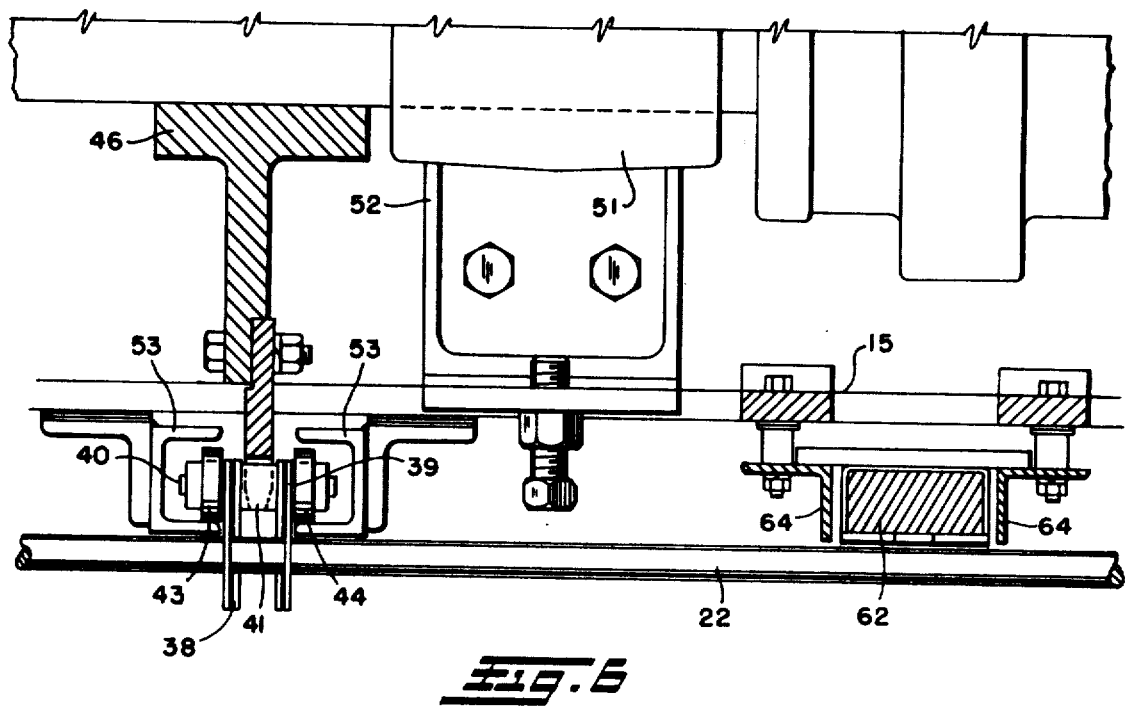
FIG. 6 is a fragmentary section taken substantially on the line 6—6 of FIG. 5 showing the construction at the head shaft end of the conveyor in more detail.

As shown in FIG. 6, the outer edge of the magnetic rail 62 is preferably spaced from the surface of the pipe 22 so that the pipe will be carried by the links 39 of chains 38 and there will not be frictional engagement between the pipe and magnetic rail. In some cases where rolling action of the pipe is desired, the magnetic rail 62 may be adjusted to engage the pipe and therefore precipitate rolling action as the pipe is moved along the transition section and lower level of the conveyor. The magnetic rails 62 are disposed adjacent the chain 38 to support the pipe 22 which is responsive to the magnetic force and normally is of steel or other material with an iron base. The pipe 22 is carried along in the effective magnetic field of magnetic rails 62 and is thereby prevented from falling in the lower level and transition section of the conveyor where no other support is provided.

After the pipe 22 has been cooled by travelling with the chains 38 over the upper level around the transition section and along the lower level, the pipe is unloaded onto roll type conveyors 68, 69, 70 and 71 located under the lower level for conveying the pipe to another location for further processing such as in a straightening machine. The roll type conveyor 68 shown in FIG. 3 has legs 76 supporting a horizontal beam 77 on which are mounted a plurality of motor driven rolls 78 for transferring the pipe 22 laterally of the table structure 10. The conveyor has unloading stations above the roll type conveyors and at each unloading station pusher members such as vertically extending arms 79 are located between the chains 38 and above the lower level.

At the lower end of each of the vertical arms 79 a pusher foot 80 having a face sloping toward the fingers 60 of the links 39 is provided for accurately displacing the pipe 22 onto the rolls 78 of the roll type conveyors 68, 69 and 70. The upper ends of the vertical arms 79 are pivoted to rocker arms 83 carried by a rock shaft 84 which is mounted for rotation in bearing members 85 fastened to the longitudinal beams 16 of the table structure 10. An actuating arm 86 connects the rock shaft 84 to a piston rod 87 of an air cylinder 88 which may be supported by one of the longitudinal beams 16 or as shown in FIG. 4 by lateral beam 15.

The air cylinder 88 is connected to a source of air pressure (not shown) and may be a double acting cylinder to provide for positive movement of the vertical arm 79 between the up position shown in solid lines and the down position shown in phantom lines in FIG. 4. In the down position the vertical arms 79 push the pipes 22 out of the effective magnetic field of the magnetic rails 62 and cause the pipes to drop on the roll type conveyors 68, 69 and 70. A permanent deflector (not shown) over roll type conveyor 71 causes any pipe 22 which reaches that position to unload on the rolls 78.

Unloading at the other unloading positions is done selectively so that the pipes 22 are unloaded only when the roll type conveyors 68, 69 and 70 do not have pipes 22 supported on the rolls 78. This is determined by proximity switches 89 or other sensing means mounted on the conveyor below the space occupied by the pipe. At each unloading station a limit switch 92 or other sensing means is provided to indicate when a pipe 22 is in position for unloading on the conveyor roll 78 located below the vertical arm 79. For example, when the pipe 22 is over roll type conveyor 68, an arm 93 of limit switch 92 is tripped to energize a relay (not shown) which in turn actuates an air valve to the air cylinder 88 causing the piston rod 87 to move upwardly and rotate the rock shaft 84 in a counterclockwise direction which depresses the vertical arm 79 and engages the pusher foot 80 with the pipe 22 causing it to be pushed out of the effective magnetic field of the magnetic rail 62 and onto the rolls 78 of roll type conveyor 68. As shown in FIG. 4, when the pipe 22 is resting on the roll 78 it will cover the proximity switch 89 which in turn energizes a relay (not shown) to open the loading circuit for this unloading station. This will prevent unloading another pipe onto the conveyor until the previous one has cleared the cooling table. A pipe which is not unloaded at roll type conveyor 68 because another pipe 22 has not cleared the cooling table will move to the unloading station over roll type conveyor 69 where the arm 93 of a limit switch 92 at this station will actuate the limit switch and cause the vertical arm 79 at this station to push the pipe onto roll 78 where the proximity switch 89 on this roll type conveyor line 69 will be energized in the same manner as was described for roll type conveyor 69. A pipe 22 which passes roll type conveyors 68 and 69 will actuate the arm 93 of a limit switch 92 at the loading station above roll type conveyor 70 and will be ejected onto the rolls 78 of this conveyor unless a pipe 22 is already being carried by the rolls and has not cleared the cooling table. In this event, the pipe will move to roll type conveyor 71 where a deflector (not shown) causes the pipe to move out of the effective magnetic field of the magnetic rails 62 and onto the roll 78 of this conveyor.

Although four conveyor stations are shown in this embodiment it is understood that additional conveyor lines may be added along the lower level of this conveyor. Pipe cradles 94 such as that shown in phantom lines in FIG. 2 may also be located at the ends of the conveyor table 10 or under the table to receive pipe 22 which is to be stored or moved in a bundle to another location.

This equipment is of a heavy duty type which is run continuously and accordingly a centralized system may be provided to lubricate the many moving parts.

With the above described apparatus automated handling of large quantities of pipe is possible in a reasonable floor space area for cooling on an upper level and transition around the end of a cooling table to a lower level where there is selective ejection of the pipes at different unloading stations onto conveyors located below the lower level.

While certain representative embodiments and details have been shown for the purpose of illustrating the invention, it will be apparent to those skilled in the art that various changes and modifications may be made therein without departing from the spirit or scope of the invention.

We, therefore, particularly point out and distinctly claim as our invention:

1. A multiple level conveyor for articles responsive to magnetic forces having a lower level located under an upper level comprising an endless member for transferring articles between overlapping levels and article supporting means including a magnetic rail disposed adjacent said endless member and extending from said upper level to said lower level, an upper portion of said rail extending over a lower portion of said rail to retain articles on the conveyor as they are carried between said levels and said endless member having spaced-apart projections extending upwardly on said upper level and extending downwardly on said lower level and in intermediate angular positions between said upper level and said lower level for separating the articles and holding them in spaced-apart positions on the conveyor.

2. A multiple level conveyor according to claim 1, wherein said magnetic rail is positioned above said endless member in said lower level so that the articles will be carried by said endless member without frictional engagement with said magnetic rail.

3. A multiple level conveyor for articles responsive to magnetic forces comprising article moving means for transferring articles carried on an upper level to a lower level and article supporting means including a magnetic rail disposed adjacent said article moving means in portions of the conveyor where the articles are unsupported by other conveyor members and extending from said upper level to said lower level, said article moving means comprising an endless member having spaced apart projections extending upwardly on said upper level and extending downwardly on said lower level and in intermediate angular positions between said upper level and said lower level for separating the articles and holding them in spaced-apart positions on the conveyor and said endless member being supported by a guide member to maintain the relative position of the endless member and said magnetic rail.

* * * * *